(12) United States Patent
Hinner et al.

(10) Patent No.: US 11,656,113 B2
(45) Date of Patent: May 23, 2023

(54) BULK MATERIAL METERING SYSTEM

(71) Applicant: AGRA Industries, Inc., Merrill, WI (US)

(72) Inventors: Pat Hinner, Gleason, WI (US); Robert Klessig, Merrill, WI (US); Benjamin Bostrom, Merrill, WI (US)

(73) Assignee: AGRA Industries, Inc., Merrill, WI (US)

( * ) Notice: Subject to any disclaimer, the term of this patent is extended or adjusted under 35 U.S.C. 154(b) by 0 days.

(21) Appl. No.: 16/516,650

(22) Filed: Jul. 19, 2019

(65) Prior Publication Data

US 2021/0018352 A1   Jan. 21, 2021

(51) Int. Cl.
*G01F 11/24* (2006.01)
*B65G 65/48* (2006.01)
*G01F 11/00* (2006.01)

(52) U.S. Cl.
CPC .......... *G01F 11/24* (2013.01); *B65G 65/4881* (2013.01); *G01F 11/003* (2013.01)

(58) Field of Classification Search
CPC .... G01F 11/24; G01F 11/003; B65G 65/4881
USPC ...................................................... 222/410
See application file for complete search history.

(56) References Cited

U.S. PATENT DOCUMENTS

| | | | | |
|---|---|---|---|---|
| 1,024,785 A * | 4/1912 | Johnson, Jr. | ......... | A01C 23/042 137/584 |
| 2,428,241 A * | 9/1947 | Pootjes | ............. | B65G 53/4633 222/368 |
| 2,529,445 A * | 11/1950 | Paull | .................. | B65G 65/4881 222/217 |
| 2,538,320 A * | 1/1951 | Mylting | ............. | B65G 53/4633 222/338 |
| 2,632,399 A * | 3/1953 | Hyre | ..................... | F01C 21/089 418/137 |
| 2,644,724 A * | 7/1953 | Kronstad | ........... | B65G 53/4633 406/64 |
| 2,650,739 A * | 9/1953 | Boydstun | ................ | G01F 11/24 222/82 |
| 2,754,995 A * | 7/1956 | Switzer | ................... | G01F 11/24 222/63 |
| 2,886,216 A * | 5/1959 | Oholm | ............... | B65G 65/4881 222/282 |
| 3,072,301 A * | 1/1963 | Burke | .................... | B65G 65/00 222/342 |
| 3,085,831 A * | 4/1963 | Mylting | ............. | B65G 53/4633 406/65 |
| 3,151,784 A * | 10/1964 | Tailor | ................. | B65G 53/4633 222/368 |
| 3,294,454 A * | 12/1966 | Foerster | .............. | F01C 21/0836 406/102 |
| 3,556,355 A * | 1/1971 | Ruiz | ...................... | B65B 37/08 222/368 |
| 3,593,891 A * | 7/1971 | Kidd | .................. | B65G 53/4633 406/65 |

(Continued)

*Primary Examiner* — Paul R Durand
*Assistant Examiner* — Michael J. Melaragno
(74) *Attorney, Agent, or Firm* — Merchant & Gould P.C.

(57) ABSTRACT

A system and method for dispensing and simultaneously metering bulk material from storage bins, silos, rail cars, and other bulk material storage structures is provided. The bulk material metering system is configured to stop the flow of the bulk material on demand. The system is robust and capable of reliably and accurately dispensing and metering bulk materials with minimal maintenance.

16 Claims, 12 Drawing Sheets

(56) References Cited

U.S. PATENT DOCUMENTS

| | | | | |
|---|---|---|---|---|
| 3,858,759 A * | 1/1975 | Lubenow | ............... | D01G 23/06 222/55 |
| 3,895,745 A * | 7/1975 | Hook | ............... | G01F 11/24 222/368 |
| 3,913,800 A * | 10/1975 | Logan | ............... | B23P 15/00 222/368 |
| 3,934,937 A * | 1/1976 | Tee | ............... | B65G 53/4641 406/67 |
| 3,999,690 A * | 12/1976 | Deckler | ............... | A01C 7/046 222/367 |
| 4,030,642 A * | 6/1977 | Morrison | ............... | B65G 65/4881 222/368 |
| 4,059,205 A * | 11/1977 | Heyl | ............... | B65G 53/4633 222/368 |
| 4,072,253 A * | 2/1978 | Walters, Jr. | ............... | B65G 65/4881 222/368 |
| 4,155,486 A * | 5/1979 | Brown | ............... | B65G 53/4633 222/197 |
| 4,179,043 A * | 12/1979 | Fischer | ............... | G01F 11/24 222/368 |
| 4,180,188 A * | 12/1979 | Aonuma | ............... | B65G 53/4633 222/368 |
| 4,268,205 A * | 5/1981 | Vacca | ............... | B65G 53/4633 222/368 |
| 4,378,897 A * | 4/1983 | Kattelmann | ............... | B65D 90/48 198/316.1 |
| 4,602,727 A * | 7/1986 | Jackson | ............... | G01F 11/24 222/368 |
| 4,611,731 A * | 9/1986 | Hafner | ............... | G01F 11/24 222/288 |
| 4,773,626 A * | 9/1988 | Rohlfing | ............... | B01J 8/002 137/240 |
| 4,784,298 A * | 11/1988 | Heep | ............... | B65G 53/4633 222/350 |
| 4,823,993 A * | 4/1989 | Siegel | ............... | B65G 53/4633 222/345 |
| 4,946,078 A * | 8/1990 | Heep | ............... | B65G 53/4633 222/368 |
| 4,948,017 A * | 8/1990 | Heep | ............... | B65G 53/4633 222/368 |
| 5,002,084 A * | 3/1991 | Wilson | ............... | B65G 53/4633 137/15.24 |
| 5,029,517 A * | 7/1991 | Sigmon | ............... | B65G 53/4633 222/444 |
| 5,114,053 A * | 5/1992 | Beirle | ............... | B65G 53/4633 222/345 |
| 5,201,441 A * | 4/1993 | Hoppe | ............... | B65G 53/4633 222/368 |
| 5,307,963 A * | 5/1994 | Mitchell | ............... | G01F 11/24 222/368 |
| 5,368,311 A * | 11/1994 | Heyl | ............... | B65G 53/4633 222/368 |
| 5,409,147 A * | 4/1995 | Ingram | ............... | B65G 53/4633 222/368 |
| 5,544,995 A * | 8/1996 | Ogawa | ............... | B65G 53/4633 414/219 |
| 5,630,691 A * | 5/1997 | Newbolt | ............... | G01F 11/24 222/368 |
| 5,725,332 A * | 3/1998 | Harper | ............... | B65G 53/4633 406/67 |
| 6,062,439 A * | 5/2000 | Ambs | ............... | G01F 11/24 222/368 |
| 6,237,816 B1 * | 5/2001 | Boritzki | ............... | B65G 53/4633 222/1 |
| 6,779,691 B2 * | 8/2004 | Cheng | ............... | B65G 53/4633 222/368 |
| 7,419,358 B2 * | 9/2008 | Heep | ............... | B65G 53/4633 222/368 |
| 7,597,219 B2 * | 10/2009 | O'Leary | ............... | B65G 53/4633 222/349 |
| 7,757,903 B2 * | 7/2010 | Schwartz | ............... | B65G 53/4633 110/276 |
| 7,878,431 B2 * | 2/2011 | Blickley | ............... | B07B 1/20 222/170 |
| 7,971,814 B2 * | 7/2011 | Evans | ............... | B02C 23/30 241/60 |
| 9,469,491 B2 * | 10/2016 | Kaljunen | ............... | B65G 65/4881 |
| 9,574,412 B2 | 2/2017 | Pham et al. | | |
| 9,643,798 B2 * | 5/2017 | Kirchhoff | ............... | B65G 53/4633 |
| 9,909,398 B2 | 3/2018 | Pham | | |
| 10,137,420 B2 | 11/2018 | Luharuka et al. | | |
| 10,300,830 B2 | 5/2019 | McIver et al. | | |
| 10,561,058 B2 * | 2/2020 | Gilstring | ............... | A01C 7/124 |
| 10,836,568 B2 | 11/2020 | Managan, II et al. | | |
| 2004/0035889 A1 * | 2/2004 | Mothersbaugh | ............... | G01F 11/22 222/368 |
| 2005/0087566 A1 * | 4/2005 | Hohmann | ............... | G01F 11/18 222/361 |
| 2005/0247734 A1 * | 11/2005 | Kato | ............... | B03C 1/14 222/190 |
| 2005/0269369 A1 * | 12/2005 | Pfeiffer | ............... | B65G 53/4633 222/367 |
| 2007/0138211 A1 * | 6/2007 | O'Leary | ............... | B65G 53/4633 222/368 |
| 2008/0093391 A1 * | 4/2008 | Schwartz | ............... | B65G 53/4633 222/368 |
| 2011/0049198 A1 * | 3/2011 | Muth | ............... | G01F 11/24 222/636 |
| 2013/0277399 A1 * | 10/2013 | Zinser | ............... | B65G 53/4633 222/368 |
| 2014/0044495 A1 * | 2/2014 | Kirchhoff | ............... | B65G 53/4633 406/100 |
| 2015/0191317 A1 * | 7/2015 | Kaljunen | ............... | B65G 65/4881 222/345 |
| 2017/0008708 A1 * | 1/2017 | Kirchhoff | ............... | B65G 53/34 |
| 2021/0062632 A1 | 3/2021 | Lambert | | |

* cited by examiner

BULK MATERIAL METERING SYSTEM

TECHNICAL FIELD

The present disclosure provides a system and method for metering bulk materials.

BACKGROUND OF THE INVENTION

Bulk materials are solids that are powdery, granular or lumpy in nature. They include, but not limited to, minerals, ores, coal, cereals, woodchips, sand, gravel, ash, salt, grain, sugar, plastic pellets, animal feed, flour, ceramics, stone in loose bulk form, etc. Bulk materials are often stored in large bulk material storage structures such as bins and silos. It is often desirable to measure (meter) such materials as they are dispensed from the bulk material storage structures. In some applications, it is desirable to use gravity to feed the bulk material through a dispensing device that controls the flow rate of the bulk materials and measure the amount of bulk materials as it is dispensed. It is often desirable to more accurately meter the material as it flows out of a bulk material storage structure than is possible by simply opening a trap door in the bulk material storage structure to allow the material to flow out of the structure for a particular amount of time or until a container receiving the flow of bulk material appears to be sufficiently filled.

SUMMARY

The present disclosure provides a system for dispensing and simultaneously metering bulk material from storage bins, silos, rail cars, and other bulk material storage structures. In the present disclosure, the system is configured to stop the flow of the bulk material on demand. The system is robust and capable of reliably and accurately dispensing and metering bulk materials with minimal maintenance.

DETAILED DESCRIPTION

Figure 1:
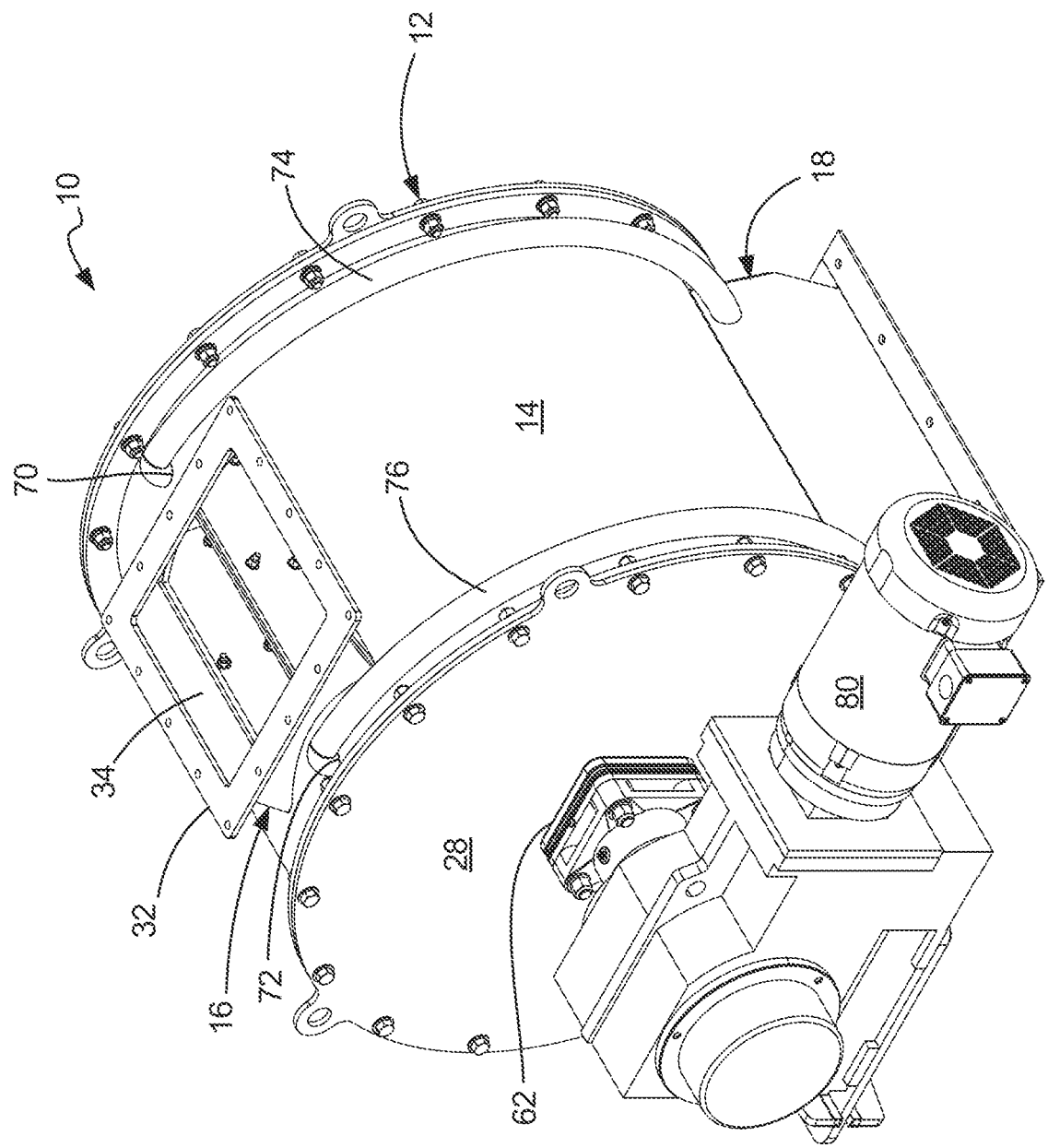
FIG. 1 is a left side isometric view of an embodiment of the bulk material metering device of the present disclosure.
Figure 2:
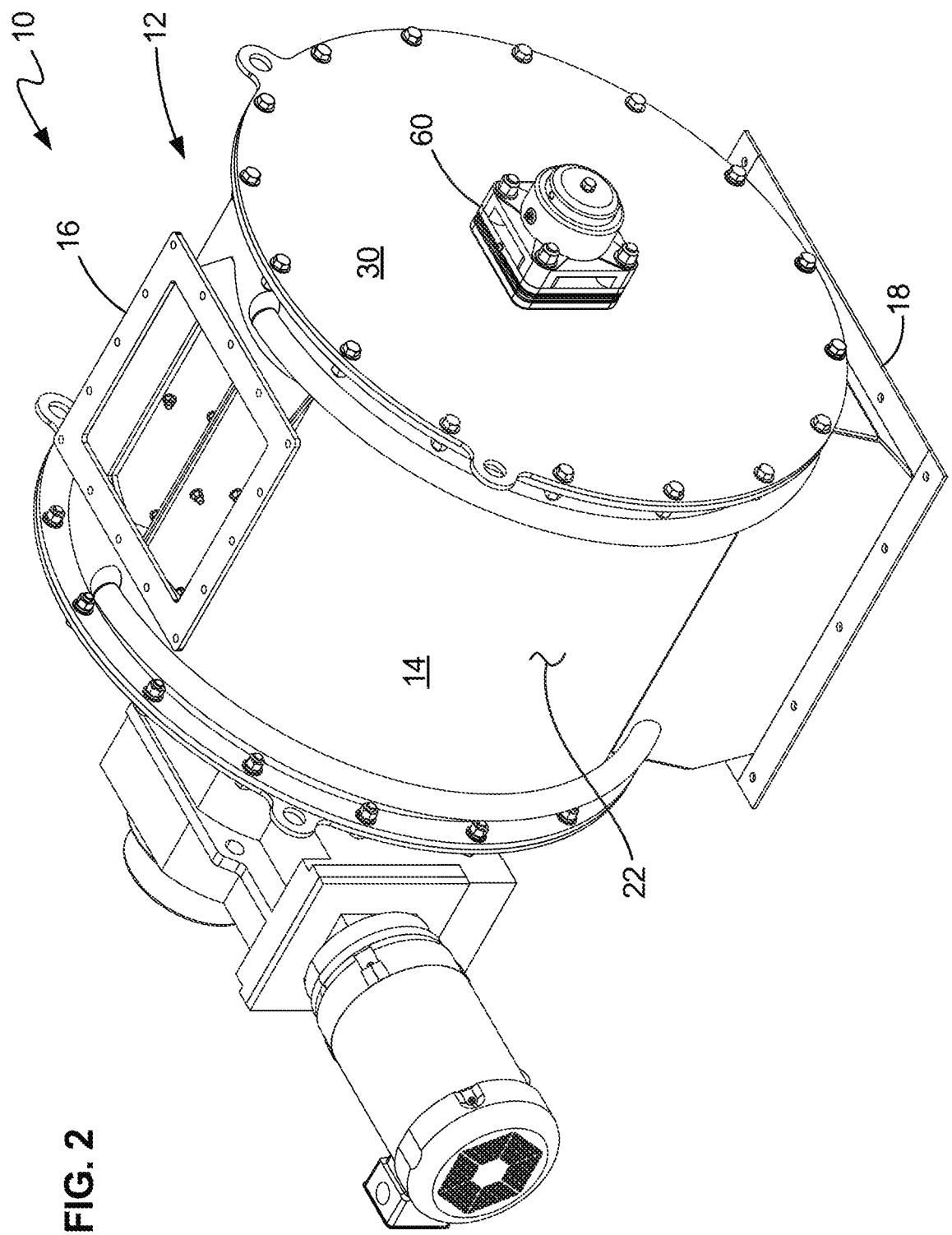
FIG. 2 is a right side isometric view of the bulk material metering device of FIG. 1.
Figure 3:
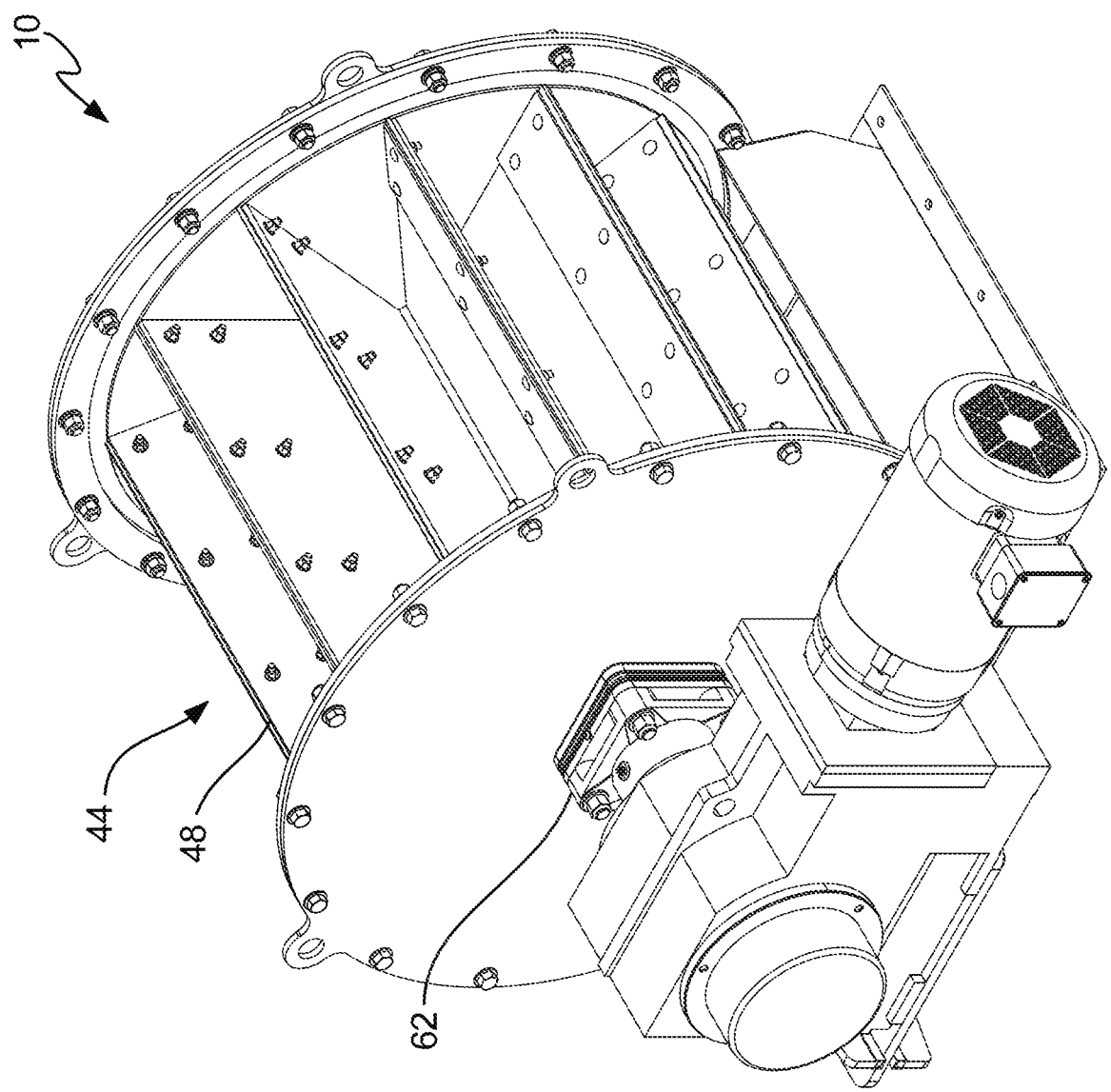
FIG. 3 is FIG. 1 with the cylindrical body portion removed.
Figure 4:
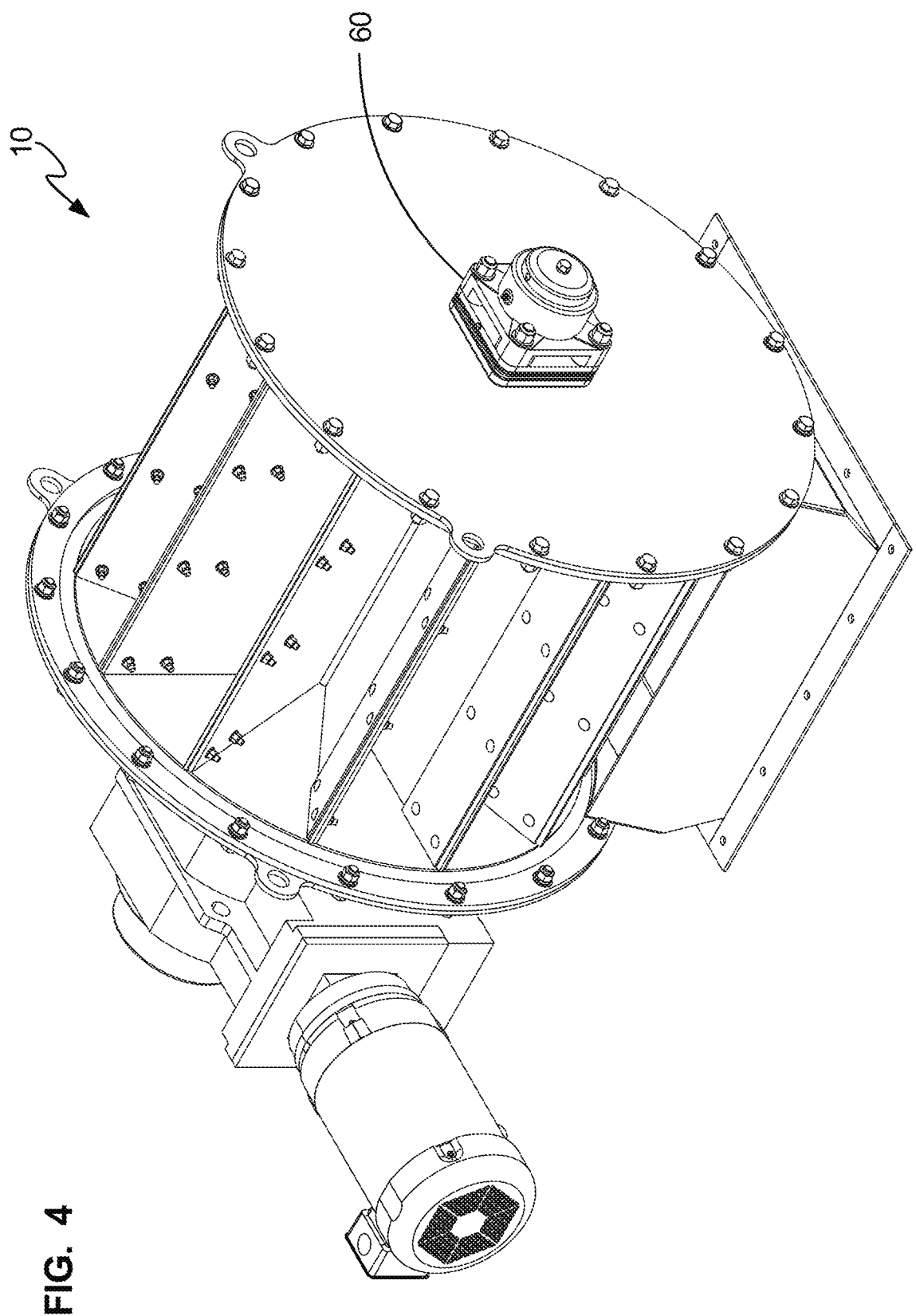
FIG. 4 is FIG. 2 with the cylindrical body portion removed.
Figure 5:
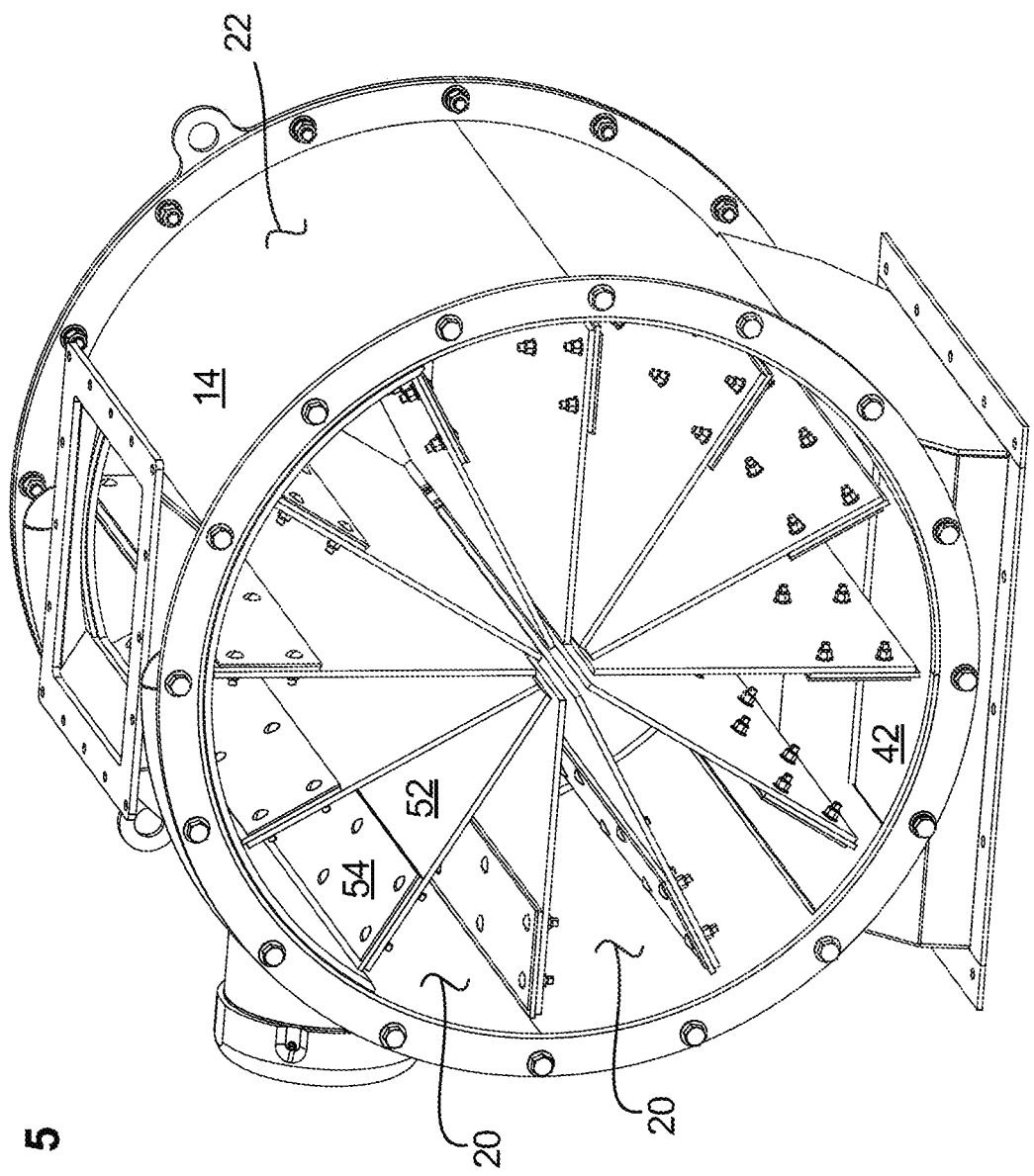
FIG. 5 is a right side isometric view of the bulk material metering device of FIG. 1 with an end cap removed.

Referring to the figures generally, a bulk material metering device according to the present disclosure is described in further detail. In the depicted embodiment, the bulk material metering device 10 includes a housing 12. In the depicted embodiment, the housing 12 includes a cylindrical body portion 14, a material receiving chute 16, a material discharge chute 18, a first end cap 28, and a second end cap 30. It should be appreciated that many alternative embodiments are also possible.

Figure 6:
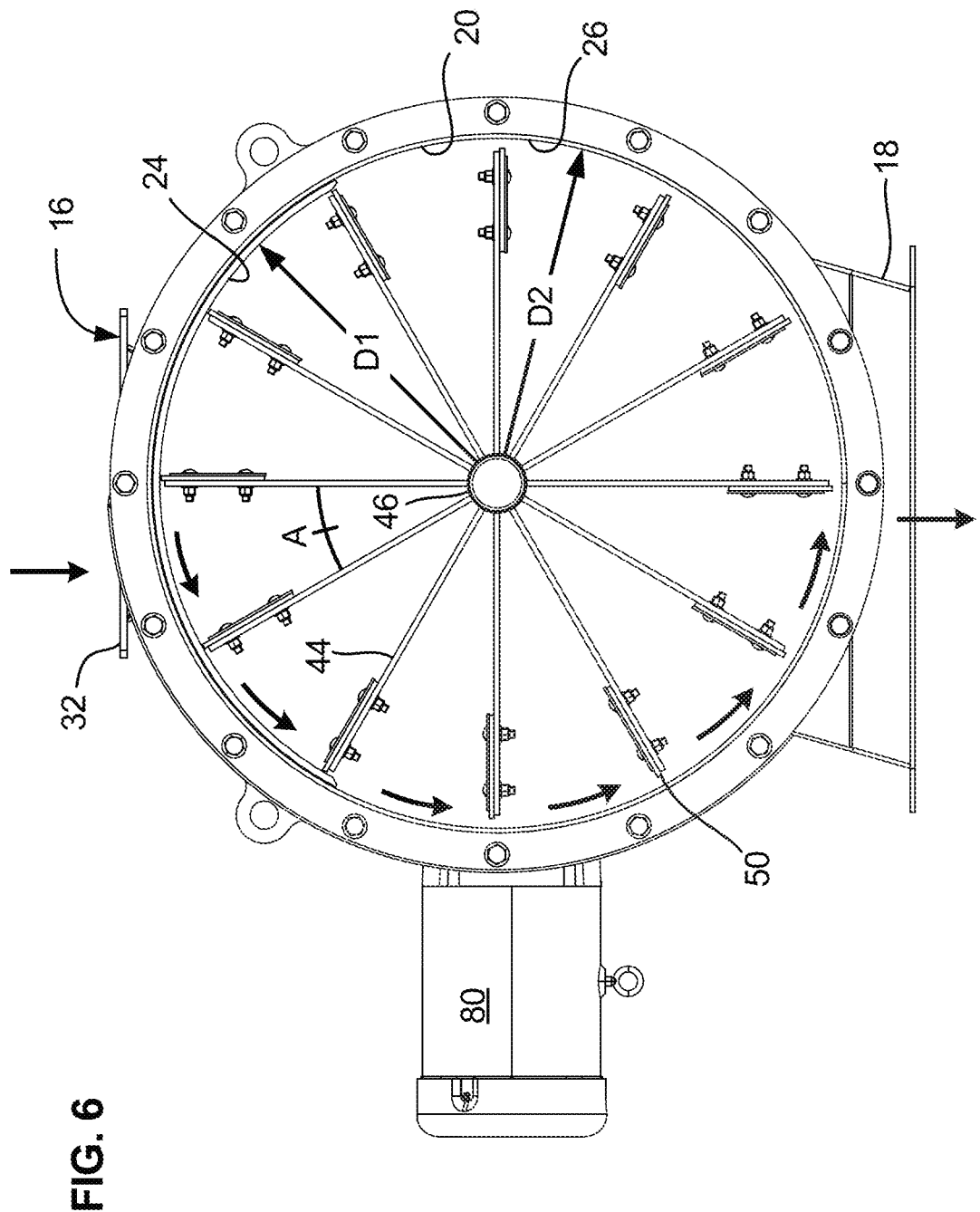
FIG. 6 is a right side elevation view of the bulk material metering device of FIG. 1 with an end cap removed.
Figure 8:
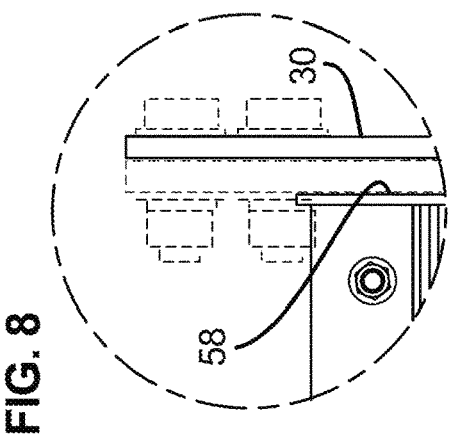
FIG. 8 is an enlarged portion of FIG. 7.
Figure 7:
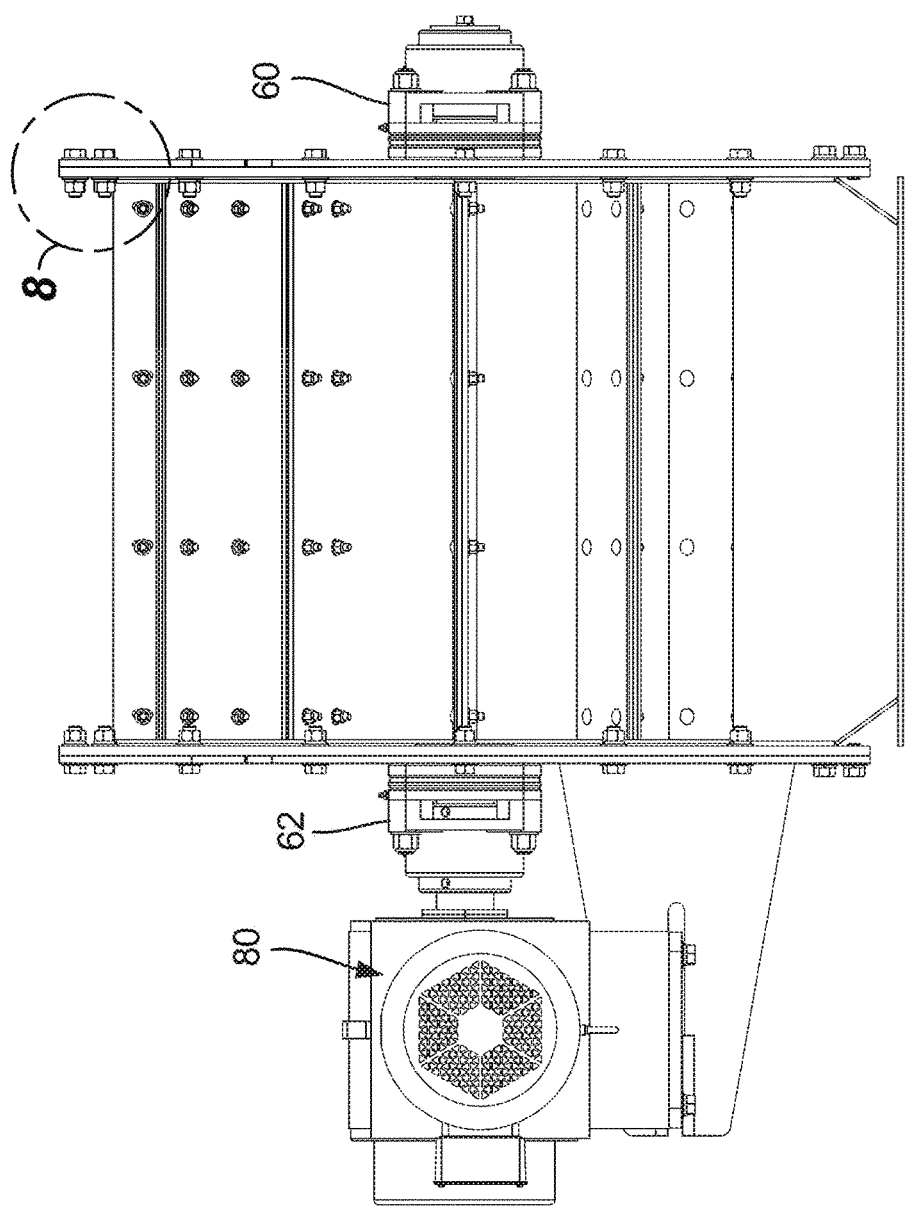
FIG. 7 is a front elevation view of the bulk material metering device of FIG. 1 with the cylindrical body portion removed.
Figure 9:
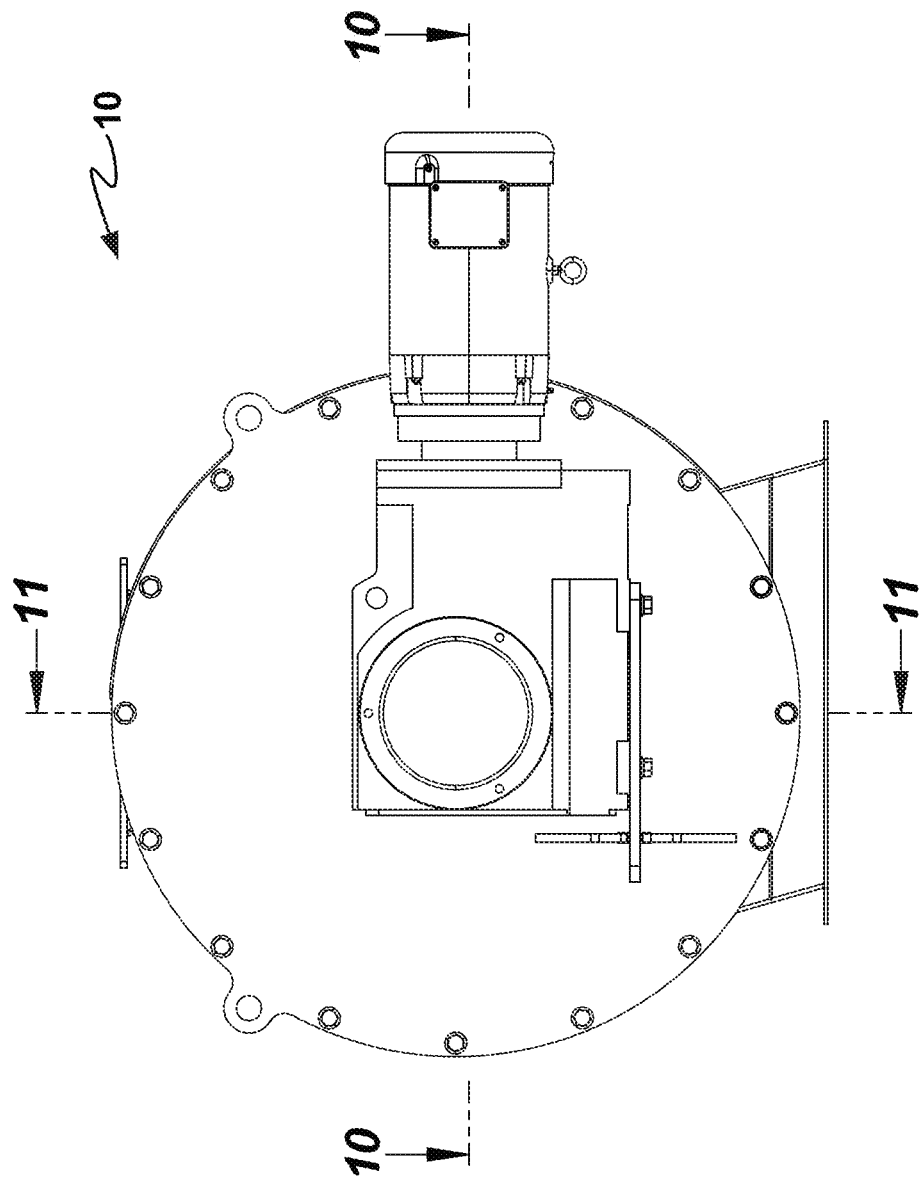
FIG. 9 is a right side elevation view of the bulk material metering device of FIG. 1.
Figure 10:
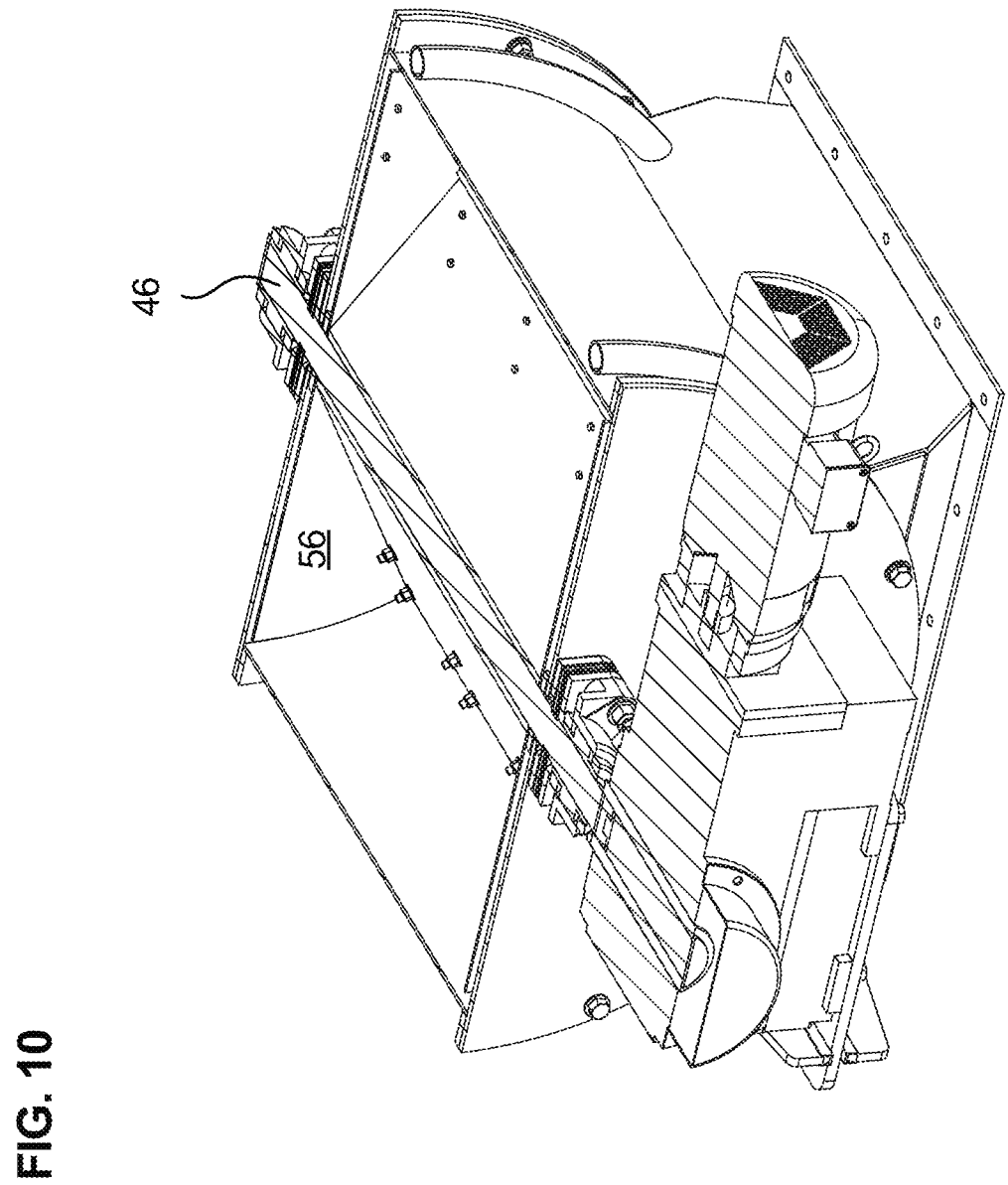
FIG. 10 is a cross-sectional view along line 10-10 in FIG. 9.

In the depicted embodiment, the cylindrical body portion 14 is concentric about a generally horizontal central axis. The cylindrical body portion 14 includes an inner surface 20 and an outer surface 22. In the depicted embodiment, the inner surface 20 includes a first inner diameter portion 24 defined by a first diameter D1 and a second inner diameter portion 26 defined by a second diameter D2. See FIG. 6. In the depicted embodiment, the first diameter D1 is smaller than the second diameter D2. It should be appreciated that many alternative embodiments are also possible. Alternative embodiments could include, for example, cylindrical body portions 14 having an inner surface 20 that is defined by a single diameter rather than multiple different diameters. In the depicted embodiment, vents 70, 72 are located on an upper portion of the cylindrical body portion 14. The vents 70, 72 in the depicted embodiment facilitate air circulation and prevent pressure build ups. The vents 70, 72 direct what has been driven to the upper portion of the cylindrical body portion 14 into the tubes 74, 76 that direct the air to the discharge chute 18, which is at atmospheric pressure.

In the depicted embodiment, the material receiving chute 16 is connected to an upper portion of the cylindrical body portion 14. In the depicted embodiment, the material receiving chute 16 is configured with a flange 32 that mounts to the bottom of a silo or other bulk material storage structure. The material receiving chute 16 also includes a closeable doorway 34. In the depicted embodiment, the bulk material metering device 10 is configured such that the closable doorway 34 can remain open during ordinary use. In the depicted embodiment, the closable doorway 34 need not be closed to stop the flow of bulk material through the device 10. In the depicted embodiment, the material receiving chute 16 is in vertical alignment with a bulk material receiving aperture 40 located on an upper portion of the cylindrical body 14. In the depicted embodiment, the bulk material receiving aperture 40 has a width W1. The overall width of the cylindrical body portion 14 has a width of W2. In the depicted embodiment, the width W1 of the bulk material receiving aperture 40 is at least 70 percent less than a width W2 of the cylindrical body portion 14. In the depicted embodiment, gravity is used to feed the bulk material from the bulk material storage structure into the bulk material metering device 10. It should be appreciated that many alternative embodiments are also possible. In some alternative embodiments, conveyors can be utilized to feed bulk material into the bulk material metering device 10 and the chute 16 does not include a closable doorway 34.

In the depicted embodiment, the material discharge chute 18 is connected to a lower portion of the cylindrical body portion 14. In the depicted embodiment, the discharge chute 18 is in vertical alignment with a lower bulk material discharge opening 42 located on a lower portion of the cylindrical body 14. The bulk material discharge chute 18 is configured to be located over a conveyor, truck bed or other transport mechanism. It should be appreciated that many alternative embodiments are also possible. In some alternative embodiments, the discharge chute 18 connects to another container where other components are combined with the metered bulk material.

In the depicted embodiment, the first end cap 28 is secured to the cylindrical body portion 14 with a plurality of bolts that engage a flange 32. The second end cap 30 is also secured to the cylindrical body portion 14 with bolts that engage a flange 32. The first end cap 28 includes an inner surface 32 and an outer surface 34. The second end cap 30 includes an inner surface 36 and an outer surface 38. It should be appreciated that many alternative embodiments are also possible. For example, the end caps 28, 30 could alternatively be welded to the cylindrical body portion 14.

In the depicted embodiment, the bulk material metering device 10 includes a rotatable drive member 44. The rotatable drive member 44 includes a drive axis 46 extending through the cylindrical body portion 14 and is coaxial with the central axis of the cylindrical body portion 14. In the depicted embodiment, the drive axis 46 is driven by an external motor 80. The motor 80 can be any type of motor including, for example, a hydraulic motor, a gas powered motor, or an electric motor. In the depicted embodiment, the drive axis 46 is supported on bearings 60, 62 located on the first end cap 28 and the second end cap 30 of the housing 12.

In the depicted embodiment, the rotatable drive member 44 includes a plurality of radially extending paddles 48 that extend from the drive axis 46 towards the inner surface 20 of the cylindrical body portion 14. The paddles 48 include distal ends 50 that abut the first diameter portion 24 and are spaced away from the second diameter portion 26 (see FIG. 6). In the depicted embodiment, at least some of the paddles 48 include a rigid base portion 52 and a flexible distal end portion 54. In the depicted embodiment, the flexible distal end portion 54 is a wear component. In the depicted embodiment, the rigid base portion 52 of the paddle 48 is constructed of steel and the flexible distal end portion 54 has a rubber construction.

In the depicted embodiment, the distal end 50 of the paddle 48 contacts the inner surface 20 of the cylindrical body 14. In the depicted embodiment, the flexible distal end portion 54 contacts the first inner diameter portion 24 and is spaced away from the second inner diameter portion 26. In some embodiments, the flexible distal end 54 flexes and sweeps along the first diameter portion 24 as the rotatable drive member 44 rotates. In other embodiments, the distal end 50 of the paddles 48 do not contact the inner surface 20 of the cylindrical body portion 14 at all. In such embodiments, the clearance between the distal end 50 of the paddles 48 and the second inner diameter portion 26 is greater than the clearance between the distal end 50 of the paddle 48 and the first inner diameter portion 24. In the depicted embodiment, the clearance between the distal end 50 of the paddle 48 and the second inner diameter portion 26 is about 1/32 of an inch. It should be appreciated that many alternative embodiments are also possible.

In the depicted embodiment, it is desirable to have some clearance between the distal end 50 of the paddle 48 and the second inner diameter portion 26. The clearance allows for easier movement of the rotatable drive member 44 as there is less rotational resistance or drag as the rotatable drive member 44 rotates. In addition, it results in a more robust system as there is less wear on the paddles 48 as well as less wear on the cylindrical body portion 14. In the depicted embodiment, the first inner diameter portion 24 is just large enough such that the flow of bulk material is stopped when the rotation of the rotatable drive member 44 is stopped. Bulk material is allowed to flow past and between the distal end 50 of the paddle 48 and the second inner surface portion 26. It should be appreciated that many alternative embodiments are also possible.

In the depicted embodiment, the rotatable drive member 44 includes a first end plate 56 connected to a first end of the drive axis 46 and a second end plate 58 connected to a second end of the drive axis 46. In the depicted embodiment, the plurality of paddles 48 are connected to the first end plate 56 and the second end plate 58. In the depicted embodiment, each of the paddles 4$ has a generally rectangular shape with end faces which are sandwiched between the first and second end plates 56, 58. In the depicted embodiment, first end plate 56 is adjacent to and spaced away from the first end cap 28 and the second end plate 58 is adjacent to and spaced away from the second end cap 30. The bulk material is primarily contained between the first and second end plates 56, 58. This configuration results in less drag as the rotational drive member 44 rotates and less wear on the end caps 28, 30. The clearance between the end plates 56, 58 and end caps 28, 30 facilitates smooth rotation and less wear on the system as the bulk material that escapes to the outside of the end plates 56, 58 is allowed to fall through the bulk metering device. The space between the end plates 56, 58 and the end caps 28, 30 provides an internal air flow path 78 through the system. It should be appreciated that many alternative embodiments are also possible.

In the depicted embodiment, two of the adjacent radially ending paddles 48 define a wedge. The largest wedge defined by adjacent paddles 48 defines an angle A. See FIG. 6. In the depicted embodiment, the angle A between adjacent paddles 48 is the same. In the depicted embodiment, the first diameter portion 24 extends at least A degrees downstream from the edge of the bulk material receiving aperture 40. The configuration makes it possible to stop the flow of bulk material through the bulk material meter device 10 by stopping the rotation of the rotatable drive member 44. In the depicted embodiment, the first inner diameter portion 24 extends over the upper 60 degrees of the cylindrical body 14. In the depicted embodiment, the first diameter portion 24 is centered around the bulk material receiving aperture 40. In the depicted embodiment, the first diameter portion 24 is smaller if the wedges are smaller and larger if the wedges are larger. If the rotation of the rotatable drive member 44 is configured for a single direction, the first diameter portion 24 may be located only on the downstream side of the bulk material receiving aperture 40. It should be appreciated that many alternative embodiments are also possible.

In the depicted embodiment, the rotation of the rotatable drive member 44 moves bulk material through the bulk metering device 10 at a controlled and known rate. The faster the rotatable drive member 44 rotates the faster the materials are moving through the bulk material metering device 10. For example, in the depicted embodiment, the bulk material meter device 10 is capable of metering out seven hundred tons of sand per hour. By controlling the rotation rate and the time of rotation, the quantity of the bulk material can be metered. The term metering here is used synonymously with measuring. In the depicted embodiment, the rotatable drive member 44 is also a rotating metering device. As discussed above, stopping the rotation of the rotatable drive member 44 (the rotating metering device) stops the flow of bulk materials through the bulk metering device 10. The disclosed configuration avoids the need to close the inlet or outlet to block or otherwise stop the flow of the bulk materials. Under normal operation, the inlet and outlet remain open even when it is desirable to stop the flow of bulk materials. The present disclosure can meter the materials at a wide range of flow rates with very little energy. The system works with gravity rather than against it. This system has a number of advantages over pneumatic conveying systems such as the one disclosed in United States Patent Application Publication Number 2010/0237267 filed on Mar. 4, 2010. Low energy consumption, low noise, low maintenance, and high accuracy in metering are some advantages.

Figure 11:
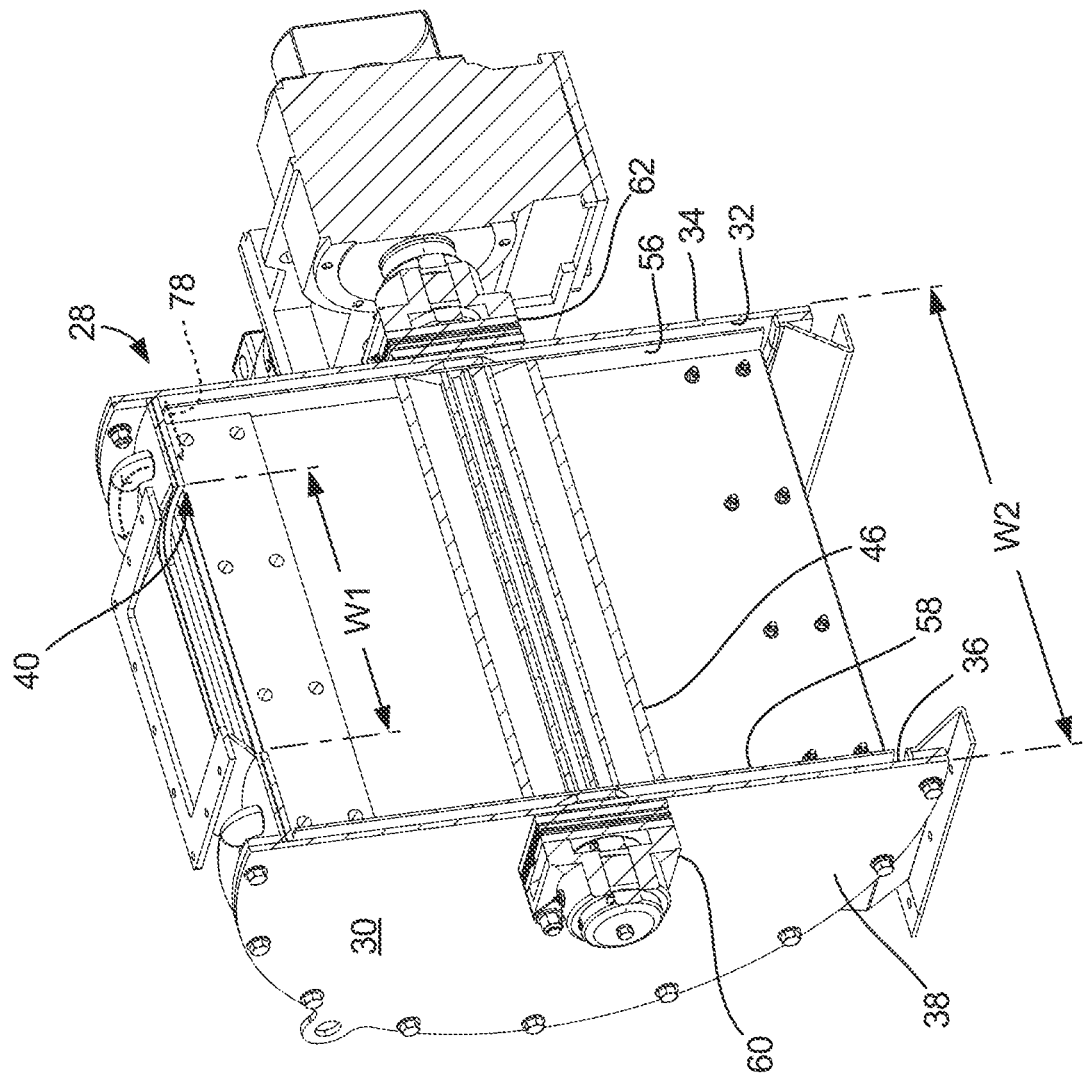
FIG. 11 is a cross-sectional view along line 11-11 in FIG. 9.
Figure 12:
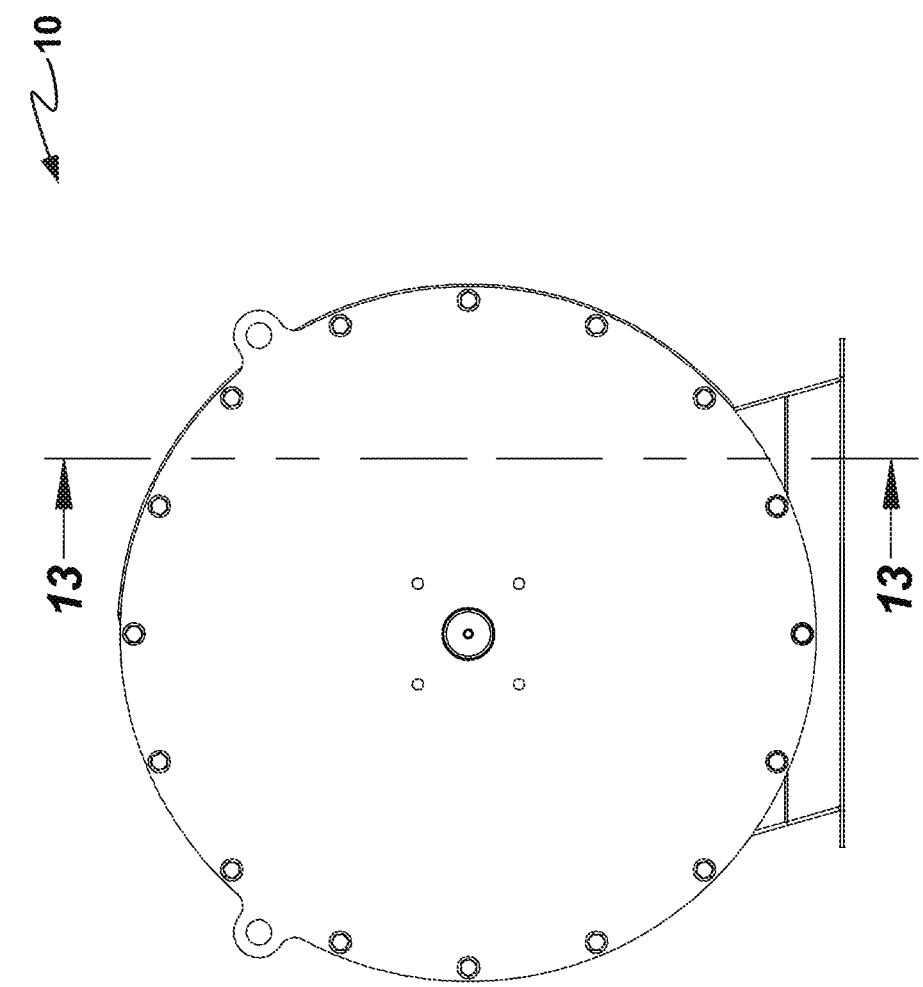
FIG. 12 is a left side elevation view of the bulk material metering device of FIG. 1.
Figure 13:
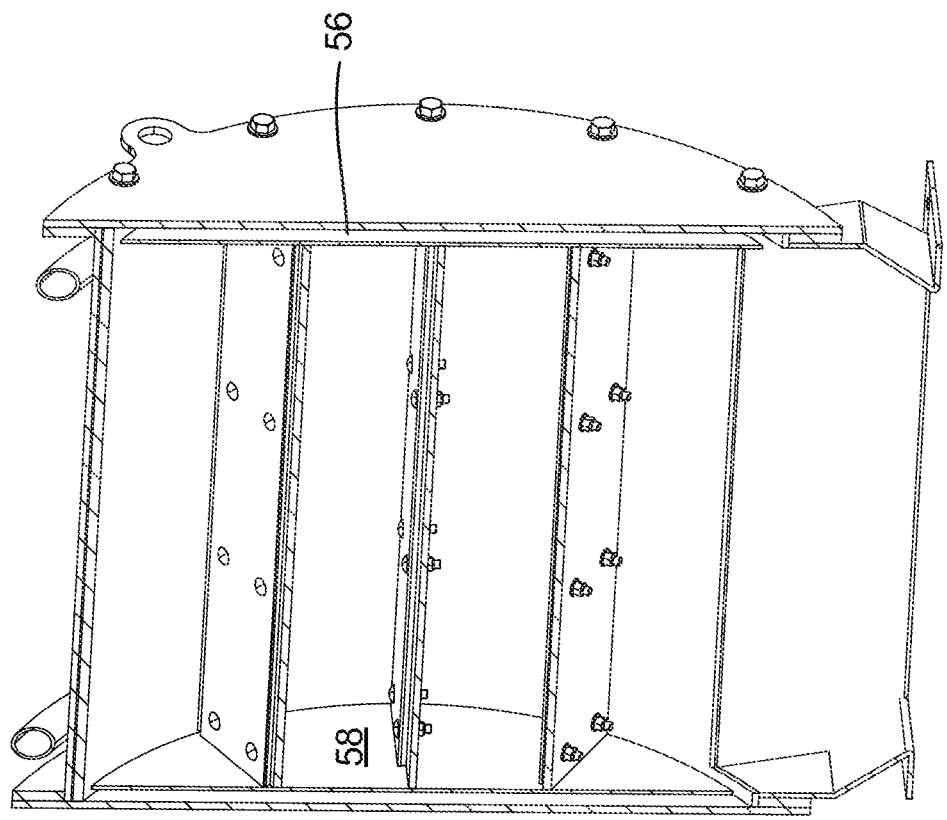
FIG. 13 is a cross-sectional view along line 13-13 of FIG. 12.

Referring generally to the figures, in the depicted embodiment, the cylindrical body 14 includes vents. In particular, the bulk material metering device includes vent outlets 70, 72 connected to vent tubes 74, 76. In the depicted embodiment, the vent tubes 74, 76 terminate at the material discharge chute 18 and are configured to redirect air vented from an upper inside portion of the cylindrical body 14 to the outlet of the cylindrical drum. In the depicted embodiment, the redirection of the air back to the material discharge chute 18 helps contain the dust within the system. FIG. 11 includes an arrow 78 that illustrates how the air from the upper portion of the cylindrical structure is free to flow from the inside of the cylindrical body 14 out the vent outlets 70, 72 and into the vent tubes 74, 76 and eventually exiting at the material discharge chute 18.

A method of metering bulk material is also provided. In the depicted embodiment, the method includes the steps of mounting a bulk metering device to the bottom of a silo; collecting the bulk material dispensed from the bulk material metering device; and driving the rotation of the metering unit within the bulk metering device at a controlled rate for a set period of time to meter a particular amount of bulk material from the silo. The method also includes the step of stopping the rotation of the metering unit to stop the flow of the bulk material from the silo. In the depicted embodiment, the bulk material in the silo is sand.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. A bulk material metering device comprising:
a housing including:
a cylindrical body portion concentric about a central axis, the cylindrical body portion including an inner surface and an outer surface, wherein the inner surface defines a first inner diameter portion defined by a first diameter and a second inner diameter portion defined by a second diameter, wherein the first inner diameter portion is immovably fixed to the second inner diameter portion and the second diameter is greater than the first diameter;
a first end cap secured to a first end of the cylindrical body portion, the first end cap including an inner surface and an outer surface;
a second end cap secured to a second end of the cylindrical body portion, the second end cap including an inner surface and an outer surface;
a bulk material receiving aperture located on an upper portion of the cylindrical body portion; and
a lower bulk material discharge opening located on a lower portion of the cylindrical body portion; and
a rotatable drive member including:
a drive axis extending through the cylindrical body portion arranged coaxial with the central axis of the cylindrical body portion;
a plurality of radially extending paddles extending from the drive axis towards the inner surface of the cylindrical body portion, wherein the paddles include distal ends that make contact with the first inner diameter portion and that are spaced away from the second inner diameter portion; and wherein at least some of the paddles comprise a rigid base portion and the distal ends comprise a flexible distal end portion;
a first end plate connected to a first end of the drive axis;
a second end plate connected to a second end of the drive axis;
wherein the plurality of paddles are connected to the first end plate and the second end plate;
wherein the first end plate is spaced away from the first end cap and defines a space;
wherein the second end plate is spaced away from the second end cap and defines a space;
wherein two adjacent radially extending paddles define a wedge, the wedge defining an angle A;
wherein the first inner diameter portion spans at least angle A of the cylindrical body portion;
wherein the first inner diameter portion is located on the upper portion of the cylindrical body portion with at least a portion of the first inner diameter portion located on a downstream side of the bulk material receiving aperture.

2. A bulk material metering device of claim 1, wherein a wear component is provided at the distal end of at least some of the plurality of paddles.

3. A bulk material metering device of claim 1, wherein at least some of the plurality of paddles include rubber wear pads connected to a steel base portion.

4. A bulk material metering device of claim 1, two of the wherein the first inner diameter portion extends at least A degrees downstream from a front edge of the bulk material receiving aperture.

5. A bulk material metering device of claim 1, wherein the drive axis is supported on bearings mounted to the first end cap and the second end cap of the housing.

6. A bulk material metering device of claim 1, wherein the first inner diameter portion is smaller than the second inner diameter portion, wherein the first inner diameter portion is the diameter of at least the upper 60 degrees of the cylindrical body portion.

7. A bulk material metering device of claim 1, further comprising a material receiving chute configured for feeding bulk material into the bulk material receiving aperture of the cylindrical body portion, the material receiving chute including a closable doorway.

8. The bulk metering device of claim 1, wherein the first diameter portion and the second diameter portion extend across the length of the cylindrical body portion from the first end cap to the second end cap.

9. A bulk metering device comprising:
a cylindrical drum including an inlet and an outlet; and
a rotating metering device configured to move bulk material from the inlet to the outlet,
wherein a rate of rotation of the rotating metering device controls a flow rate of bulk material through the cylindrical drum,
wherein the flow rate of bulk material can be stopped by stopping the rotation of the metering device while the inlet and outlet remain open, wherein the flow rate of the bulk material is mechanically controlled via the rotation rate of the metering device in that each rotation corresponds to a known amount of material transferred, wherein the cylindrical drum comprises an inner surface and an outer surface, wherein the inner surface defines a first inner diameter portion defined by a first diameter and a second inner diameter portion defined by a second diameter, wherein the first inner diameter portion is immovably fixed to the second inner diameter portion and the second diameter is greater than the first diameter, and the first inner diameter portion is adjacent the inlet and the second inner diameter portion is adjacent the outlet; and wherein the rotating metering device includes paddles with distal ends, wherein the distal ends make contact with the first diameter portion of the cylindrical drum, wherein the distal ends are spaced away from the second diameter portion of the cylindrical drum.

10. The bulk metering device of claim 9, wherein the rotating metering device includes a central drive shaft, opposed first and second end caps on the drive shaft, wherein the paddles extend from the drive shaft and are positioned between the first and second end caps.

11. The bulk metering device of claim 10, wherein the cylindrical drum includes a first end plate defining a first inner end surface and a second end plate defining a second inner end surface, wherein the first end cap has an external surface that is adjacent and spaced away from the first inner end surface.

12. The bulk metering device of claim 11, wherein the first diameter portion and the second diameter portion extend across the cylindrical drum from the first inner end surface to the second inner end surface.

13. A method of metering bulk material comprising:
mounting a bulk metering device to a bottom of a bulk material storage structure;
collecting the bulk material dispensed from the bulk material storage structure;
driving rotation of a metering unit within a cylindrical drum of the bulk metering device at a controlled rate for a set period of time to meter a particular amount of bulk material from the bulk material storage structure;
wherein the cylindrical drum comprises an inner surface and an outer surface, wherein the inner surface defines a first inner diameter portion defined by a first diameter and a second inner diameter portion defined by a second diameter, wherein the first inner diameter portion is immovably fixed to the second inner diameter portion and the second diameter is greater than the first diameter, and the first inner diameter portion is adjacent the inlet and the second inner diameter portion is adjacent the outlet; and wherein the metering unit includes paddles having distal ends, wherein the distal ends make contact with the first inner diameter portion of the cylindrical drum, wherein the distal ends are spaced away from the second inner diameter portion of the cylindrical drum.

14. The method of claim 13, further comprising the step of stopping the rotation of the metering unit to stop the flow of the bulk material from the bulk material storage structure.

15. The method of claim 13, wherein the bulk material in the bulk material storage structure is sand.

16. A bulk metering device comprising:
a drum having a body extending between a first drum end cap and a second drum end cap, the body positioned about an axis, the drum including an inlet and an outlet, wherein the inlet is at an upper portion of the drum and the outlet is at a lower portion of the drum, the inlet having a first inlet end, a second inlet end, and an inlet length, the inlet length running parallel to the axis and extending from the first inlet end to the second inlet end, the drum having a first region extending between the first drum end cap and the first inlet end, the drum having a second region extending between the second drum end cap and the second inlet end, the drum further comprising an interior and an exterior;

a rotatable arrangement within the drum configured to move bulk material from the inlet to the outlet, the rotatable arrangement being configured to be rotatably driven about the axis, the rotatable arrangement including paddles, the paddles each having a paddle length defined along the axis, wherein the inlet length is less than the paddle length, wherein the paddles include rigid base portions and flexible distal end portions defining distal ends, wherein the drum and the rotatable arrangement are relatively configured such that when the rotatable arrangement is rotated relative to the drum about the axis, the distal ends of the paddles contact the interior of the drum adjacent the upper portion of the drum and are spaced away from the interior of the drum adjacent the lower portion of the drum;

a first tube that connects to the exterior of the drum at the first region of the drum, wherein the first tube extends circumferentially about the exterior of the drum downwardly from the first region toward the lower portion of the drum; and a second tube that connects to the exterior of the drum at the second region of the drum, wherein the second tube extends circumferentially about the exterior of the drum downwardly from the second region toward the lower portion of the drum.

* * * * *